US008494332B2

(12) United States Patent
Rudenick et al.

(10) Patent No.: US 8,494,332 B2
(45) Date of Patent: Jul. 23, 2013

(54) TRAY ASSEMBLY FOR A FIBER OPTIC ENCLOSURE

(75) Inventors: Paula Rudenick, Eden Prairie, MN (US); Timothy Haataja, Prior Lake, MN (US); James J. Solheid, Lakeville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 42 days.

(21) Appl. No.: 13/292,568

(22) Filed: Nov. 9, 2011

(65) Prior Publication Data

US 2012/0169190 A1 Jul. 5, 2012

Related U.S. Application Data

(60) Provisional application No. 61/413,786, filed on Nov. 15, 2010.

(51) Int. Cl.
G02B 6/36 (2006.01)

(52) U.S. Cl.
USPC ........... 385/135; 385/134; 312/223.1; 211/26

(58) Field of Classification Search
USPC .................. 385/134–135; 312/223.1; 211/26
See application file for complete search history.

(56) References Cited

U.S. PATENT DOCUMENTS

| 5,323,478 A * | 6/1994 | Milanowski et al. ......... 385/135 |
| 7,200,314 B2 * | 4/2007 | Womack et al. .............. 385/135 |
| 7,233,731 B2 | 6/2007 | Solheid et al. |
| 7,298,952 B2 | 11/2007 | Allen et al. |
| 7,369,741 B2 | 5/2008 | Reagan et al. |
| 7,751,675 B2 | 7/2010 | Holmberg et al. |
| 7,970,249 B2 | 6/2011 | Solheid et al. |
| 8,111,966 B2 | 2/2012 | Holmberg et al. |
| 8,213,760 B2 | 7/2012 | Rudenick et al. |
| 2007/0058918 A1 | 3/2007 | Trebesch et al. |
| 2010/0284661 A1 | 11/2010 | Bran de León et al. |
| 2011/0013875 A1 | 1/2011 | Bran de León et al. |
| 2011/0026894 A1 | 2/2011 | Rudenick et al. |

FOREIGN PATENT DOCUMENTS

| JP | 9-105822 | 4/1997 |
| JP | 10-232319 | 9/1998 |

OTHER PUBLICATIONS

International Search Report and Written Opinion mailed May 2, 2012.

* cited by examiner

Primary Examiner — Ellen Kim
(74) Attorney, Agent, or Firm — Merchant & Gould P.C.

(57) ABSTRACT

A tray assembly for a fiber optic enclosure includes a mounting bracket having a first bracket, a second bracket and a divider panel. The first bracket is configured for mounting to a fiber optic enclosure. The first bracket defines a pivot axis. The second bracket is engaged to the first bracket and is adapted to pivot about the pivot axis between a closed position and an open position. The divider panel is engaged to the first bracket and is adapted to pivot about the pivot axis between a closed position and an open position. The tray assembly further includes a first set of trays engaged to the second bracket and a second set of trays engaged to the divider panel. The divider panel is disposed between the first and second sets of trays.

20 Claims, 3 Drawing Sheets

TRAY ASSEMBLY FOR A FIBER OPTIC ENCLOSURE

CROSS REFERENCE TO RELATED APPLICATION

This application claims the benefit of U.S. Provisional Patent Application Ser. No. 61/413,786, filed Nov. 15, 2010, which application is hereby incorporated by reference in its entirety.

FIELD

The present disclosure generally relates to fiber optic telecommunications equipment. More specifically, the present disclosure relates to fiber optic enclosures and related components.

BACKGROUND

As demand for telecommunications increases, optical fiber services are being extended in more and more areas. To more efficiently extend the fiber optic service into areas where current and future customers are located, often fiber optic cables with more than one optical fiber are utilized. To provide service, for example, in a multiple dwelling unit, the multi-fiber cables may be received within a fiber optic enclosure. Such enclosures provide connection locations where one or more optical fibers of the multi-fiber cable may be connected to end users/subscribers.

SUMMARY

An aspect of the present disclosure relates to a tray assembly for a fiber optic enclosure. The tray assembly includes a mounting bracket having a first bracket, a second bracket and a divider panel. The first bracket is configured for mounting to a fiber optic enclosure. The first bracket defines a pivot axis. The second bracket is engaged to the first bracket and is adapted to pivot about the pivot axis between a closed position and an open position. The divider panel is engaged to the first bracket and is adapted to pivot about the pivot axis between a closed position and an open position. The tray assembly further includes a first set of trays engaged to the second bracket and a second set of trays engaged to the divider panel. The divider panel is disposed between the first and second sets of trays.

Another aspect of the present disclosure relates to a tray assembly for a fiber optic enclosure. The tray assembly includes a mounting bracket having a first bracket, a second bracket and a divider panel. The first bracket includes a base portion and a free portion. The base portion is configured for mounting to a fiber optic enclosure. The free portion defines a pivot axis. The second bracket is engaged to the free end portion of the first bracket and is adapted to pivot about the pivot axis between a closed position and an open position. The divider panel is engaged to the free end portion of the first bracket and is adapted to pivot about the pivot axis between a closed position and an open position. The tray assembly further includes a first set of trays and a second set of trays. The first set of trays is engaged to the second bracket. Each of the trays of the first set of trays is adapted to pivot about a pivot axis defined by an adjacent tray. The second set of trays is engaged to the divider panel. The divider panel is disposed between the first and second sets of trays. Each of the trays of the second set of trays is adapted to pivot about a pivot axis defined by an adjacent tray.

Another aspect of the present disclosure relates to a fiber optic enclosure. The fiber optic enclosure includes a base having a base wall, a first sidewall that extends outwardly from the base wall and a second sidewall that extends outwardly from the base wall. A cover is engaged to the base. The base and the cover define an interior region. A tray assembly is disposed in the interior region. The tray assembly includes a mounting bracket having a first bracket, a second bracket and a divider panel. The first bracket is configured for mounting to the base wall. The first bracket defines a pivot axis. The second bracket is engaged to the first bracket and is adapted to pivot about the pivot axis between a closed position and an open position. The divider panel is engaged to the first bracket and is adapted to pivot about the pivot axis between a closed position and an open position. The tray assembly further includes a first set of trays engaged to the second bracket and a second set of trays engaged to the divider panel. The divider panel is disposed between the first and second sets of trays.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
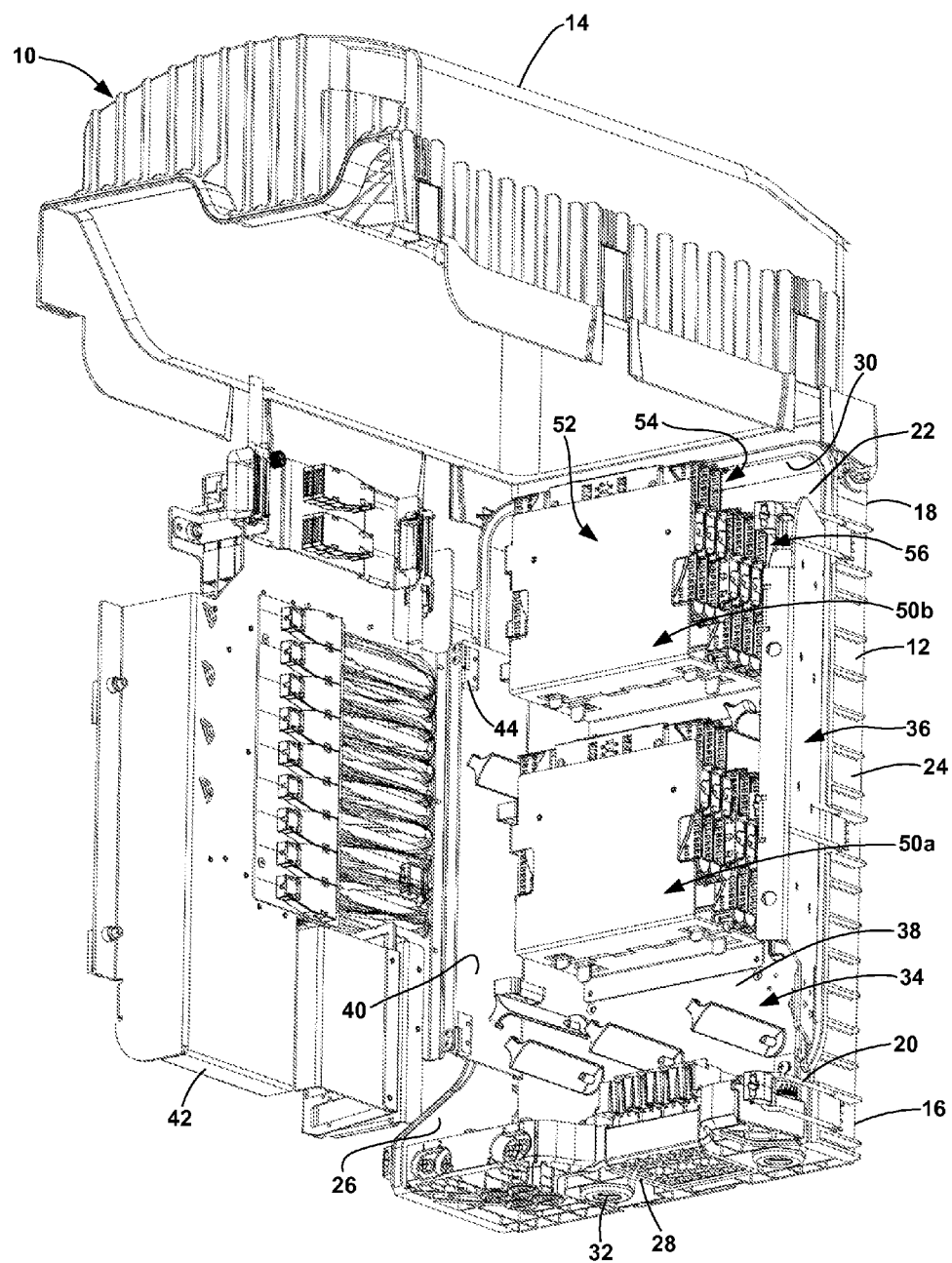
FIG. 1 is a perspective view of a fiber optic enclosure having exemplary features of aspects in accordance with the principles of the present disclosure.

Referring now to FIG. 1, a fiber optic enclosure 10 is shown. The fiber optic enclosure 10 is configured to interface incoming and outgoing cables. The fiber optic enclosure 10 includes a base 12 and a cover 14.

The base 12 includes a first end 16 and an oppositely disposed second end 18. In the depicted embodiment, the cover 14 is pivotally engaged to the second end 18 of the base 12 so that the cover 14 can pivot between an open position (shown in FIG. 1) and a closed position.

The base 12 further includes a plurality of latches 20. The plurality of latches 20 is adapted to engage the cover 14 and secure the cover 14 in the closed position. In the depicted embodiment, the base 12 include three latches 20.

The base 12 includes a base wall 22, a first sidewall 24, an oppositely disposed second sidewall 26, a first end wall 28 and an oppositely disposed second end wall 30. Each of the first and second sidewalls 24, 26 and the first and second end walls 28, 30 extends outwardly from the base wall 22. In the depicted embodiment, each of the first and second sidewalls 24, 26 and the first and second end walls 28, 30 extends outwardly from the base wall 22 in a direction that is generally perpendicular to the base wall 22.

The first end wall 28 defines a plurality of cable openings 32. The cable openings 32 provide access to and from an interior region 34 that is cooperatively defined by the base 12 and the cover 14 of the fiber optic enclosure 10. In the depicted embodiment, the second end wall 30 does not include cable openings so that the second end wall 30 is a non-pass-through end of the fiber optic enclosure 10.

In the depicted embodiment, a support frame 36 is mounted to the base wall 22 of the fiber optic enclosure 10. The support frame 36 is configured to hold telecommunication components. The support frame 36 includes a base plate 38 and a first side 40 that extends outwardly from the base plate 38. In the depicted embodiment, the first side 40 extends outwardly from the base plate 38 in a direction that is generally perpendicular to the base plate 38.

A swing frame 42 can be mounted to the first side 40 of the support frame 36. The swing frame 42 is adapted to hold telecommunications components. In the depicted embodiment, the swing frame 42 is pivotally mounted to the first side 40 of the support frame 36 by a hinge 44. The swing frame 42 is adapted to pivot between a closed position and an open position (shown in FIG. 1).

A tray assembly 50 is disposed on the base plate 38 of the support frame 36. In the depicted embodiment, a first tray assembly 50a and a second tray assembly 50b are mounted to the base plate 38 of the support frame 36. The second tray assembly 50b is disposed adjacent to the second end wall 30 of the base 12 while the first tray assembly 50a is disposed between the first end wall 28 of the base 12 and the second tray assembly 50b. Each of the first and second tray assemblies 50a, 50b includes a mounting bracket assembly 52, a first set of trays 54 and a second set of trays 56.

Figure 2:
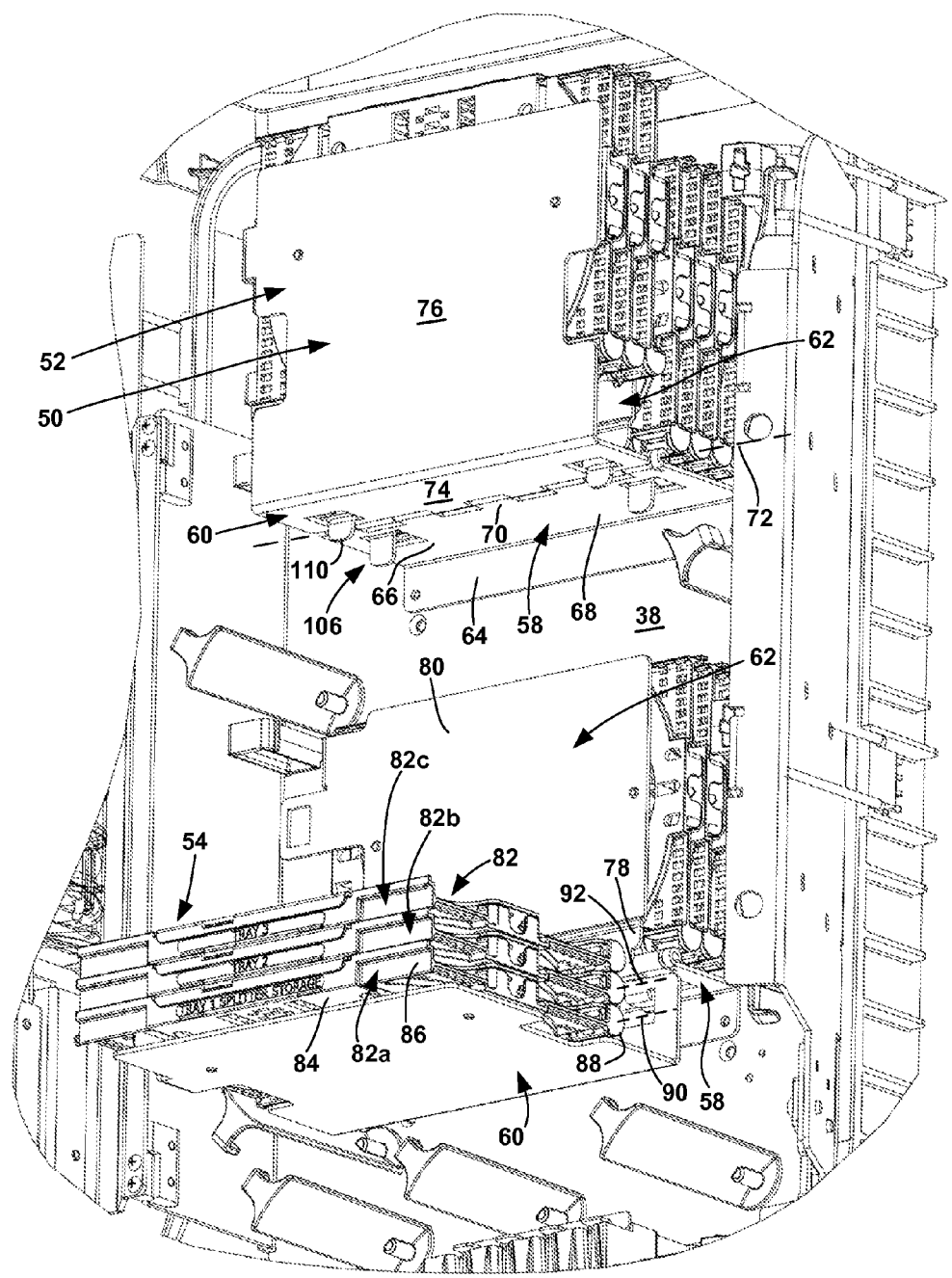
FIG. 2 is a perspective view of a tray assembly suitable for use in the fiber optic enclosure.
Figure 3:
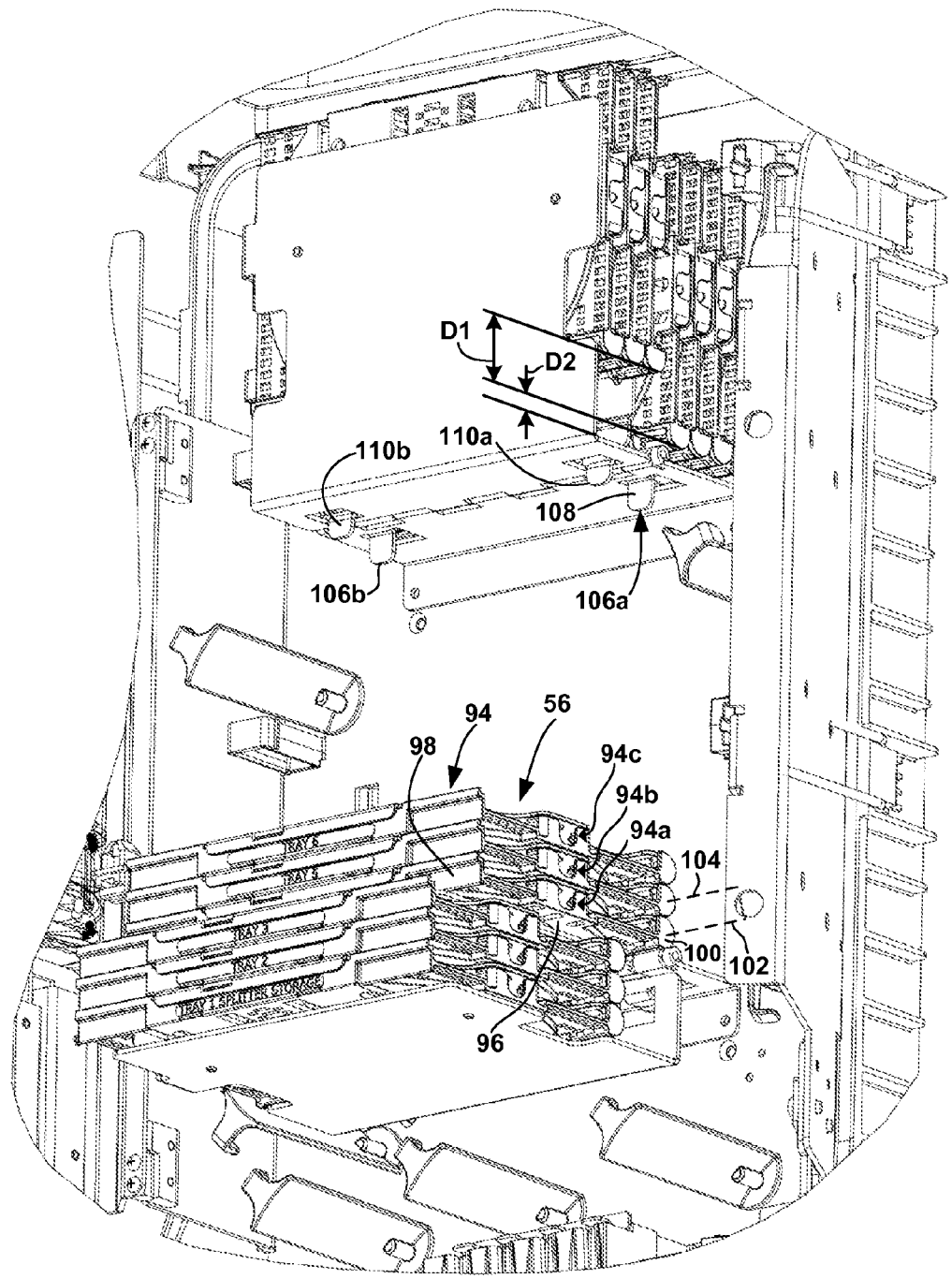
FIG. 3 is a perspective view of the tray assembly of FIG. 2 with first and second sets of trays in an open position.

Referring now to FIGS. 2 and 3, the mounting bracket assembly 52 is mounted to the base plate 38. The mounting bracket assembly 52 includes a first bracket 58, a second bracket 60 and a divider panel 62. The first bracket 58 is generally L-shaped and includes a base portion 64 and a free end portion 66. The first bracket 58 is disposed on the base plate 38 of the support frame 36 so that the base portion 64 is generally parallel to the base plate 38. The base portion 64 is fastened to the base plate 38 by a plurality of fasteners (e.g., rivets, screws, welds, adhesive, etc.). The free end portion 66 extends outwardly from the base portion 64 in a direction that is generally perpendicular to the base portion 64. The free end portion includes a base end 68 and an oppositely disposed free end 70. The base end 68 is engaged to the base portion 64. In the depicted embodiment, the base end 68 and the base portion 64 are monolithic. The free end 70 defines a pivot axis 72 that is generally parallel to the free end 70 and generally parallel to the base plate 38 of the support frame 36 when the first bracket 58 is mounted to the support frame 36.

The second bracket 60 is pivotally engaged with the free end 70 of the first bracket 58. In the depicted embodiment, the second bracket 60 is engaged with the first bracket 58 so that the second bracket 60 pivots about the pivot axis 72 between a closed position (shown in FIG. 1) and an open position (shown in FIG. 2). The second bracket 60 is generally L-shaped and includes a side portion 74 and an end portion 76. The side portion 74 is engaged to the free end portion 66 of the first bracket 58. The end portion 76 extends outwardly from the side portion 74 in a direction that is generally perpendicular to the side portion 74.

The divider panel 62 is pivotally engaged to the first bracket 58 and disposed between the base plate 38 of the support frame 36 and the second bracket 60. The divider panel 62 includes a first end portion 78 and an oppositely disposed second end portion 79. The first end portion 78 is pivotally engaged to the free end 70 of the first bracket 58 so that the divider panel 62 pivots about the pivot axis 72 between a closed position (shown in FIG. 1) and an open position (shown in FIG. 2). In the depicted embodiment, the second end portion 79 is offset from and parallel to the first end portion 78.

In one embodiment, the divider panel 62 includes a latch 80. The latch 80 is adapted to selectively retain the divider panel 62 in the closed position. In one embodiment, the latch 80 is a resilient latch.

In the depicted embodiment, the base plate 38 of the fiber optic enclosure 10 includes a latch bar 81. When the divider panel 62 is in the closed position, the latch 80 is adapted to engage the latch bar 81. In the depicted embodiment, the latch 80 can be manually disengaged from the latch bar 81 when it is desired to move the divider panel 62 to the open position by pulling on the divider panel 62.

The first set of trays 54 is mounted to the second bracket 60. The first set of trays 54 includes a plurality of trays 82. In the depicted embodiment, the first set of trays 54 includes a first tray 82a, a second tray 82b and a third tray 82c. In the depicted embodiment, the first tray 82a is a splitter tray while the second and third trays 82b, 82c are splice trays. A splice tray suitable for use in the first set of trays 54 has been described in U.S. Patent Application Publication No. 2009/0290842, the disclosure of which is hereby incorporated by reference in its entirety.

Each of the first, second and third trays 82a-c includes a base panel 84 and a first longitudinal side 86 and an oppositely disposed second longitudinal side 88. In one embodiment, the base panel 84 is configured to receive and hold a plurality of splices. In another embodiment, the base panel 84 is configured to receive and hold a plurality of splitters.

The first, second and third trays 82a-c of the first set of trays 54 pivot relative to each other. For example, in the depicted embodiment, the second tray 82b is adapted to pivot about a pivot axis 90 defined by the second longitudinal side 88 of the first tray 82a while the third tray 82c is adapted to pivot about a pivot axis 92 defined by the second longitudinal side 88 of the second tray 82b.

The base panel 84 of the first tray 82a is fastened to the end portion 76 of the second bracket 60 by a fastener (e.g., rivet, screw, tie, adhesive, etc.). The base panel 84 is fastened to the end portion 76 so that the first longitudinal side 86 faces outwardly from the second bracket 60. In the depicted embodiment, the base panel 84 is fastened to the end portion 76 so that the second longitudinal side 88 of the base panel 84 is offset from the side portion 74 of the second bracket 60 by a first distance D1.

A first plurality of pivot linkages connects the second tray 82b to the first tray 82a while a second plurality of pivot linkages connects the third tray 82c to the second tray 82b. The first plurality of pivot linkages allow the second tray 82b to pivot relative to the first tray 82a while the second plurality of pivot linkages allow the third tray 82c to pivot relative to the second tray 82b.

The second set of trays 56 is mounted to the divider panel 62. The second set of trays 56 includes a plurality of trays 94. In the depicted embodiment, the second set of trays 56 includes a first tray 94a, a second tray 94b and a third tray 94c. In the depicted embodiment, the first, second and third trays 94a-c of the second set of trays 56 are splice trays.

Each of the first, second and third trays 94a-c includes a base panel 96. The base panel 96 includes a first longitudinal side 98 and an oppositely disposed second longitudinal side 100.

The first, second and third trays 94a-c of the second set of trays 56 pivot relative to each other. For example, in the depicted embodiment, the second tray 94b is adapted to pivot about a pivot axis 102 defined by the second longitudinal side 100 of the first tray 94a while the third tray 94c is adapted to pivot about a pivot axis 104 defined by the second longitudinal side 100 of the second tray 94b.

The base panel 96 of the first tray 94a is fastened to the second end portion 79 of the divider panel 62 by a fastener (e.g., rivet, screw, tie, adhesive, etc.). The base panel 96 is fastened to the second end portion 79 so that the first longitudinal side 98 faces outwardly from the first bracket 58 when the divider panel 62 is in the closed position. In the depicted embodiment, the base panel 96 is fastened to the second end portion 79 so that the second longitudinal side 100 of the base panel 96 is offset from the free end portion 74 of the first bracket 58 by a second distance D2. In the depicted embodiment, the first distance D1 is greater than the second distance D2 so that the first longitudinal sides 86 of the first plurality of trays 82 extend farther outwardly from the base panel 38 than the first longitudinal sides 98 of the second plurality of trays 94 when the first and second pluralities of trays 82, 94 are in the open position (shown in FIG. 3).

A first plurality of pivot linkages connects the second tray 94b to the first tray 94a while a second plurality of pivot linkages connects the third tray 94c to the second tray 94b. The first plurality of pivot linkages allow the second tray 94b to pivot relative to the first tray 94a while the second plurality of pivot linkages allow the third tray 94c to pivot relative to the second tray 94b.

The second bracket 60 with the first plurality of trays 54 is adapted to pivot independently of the divider panel 62 with the second plurality of trays 56. As shown in FIG. 2, the second bracket 60 and the first plurality of trays 54 can be pivoted about the pivot axis 72 to the open position while the divider panel 62 and the second plurality of trays 56 are in the closed position. With the second bracket 60 in the open position, the second and third trays 82b, 82c of the first plurality of trays 54 can pivot relative to the first and second trays 82a, 82b, respectively, to provide access to the base panel 84 of the corresponding first, second and third trays 82a-c.

With the second bracket 60 and the first plurality of trays 54 in the open position, the divider panel 62 and the second plurality of trays 56 can be pivoted about the pivot axis 72 to the open position. With the divider panel 62 in the open position, the second and third trays 94b, 94c of the second plurality of trays 56 can pivot relative to the first and second trays 94a, 94b, respectively, to provide access to the base panel 84 of the corresponding first, second and third trays 94a-c.

As provided above, the first set of trays 54 is offset a first distance D1 from the side portion 74 of the second bracket 60 that is greater than a second distance D2 at which the second set of trays 56 is offset from the free end portion 66 of the first bracket 58 when the divider panel 62 is in the closed position. As best shown in FIG. 3, this difference in offsets of the first and second sets of trays 54, 56 allows the first set of trays 54 to extend farther outward from the base plate 38 of the support frame 36 than the second set of trays 56 when each of the second bracket 60 and the divider panel 62 is in the open position.

The first bracket 58 of the tray assembly 50 includes a stop 106. In the depicted embodiment, the stop 106 is generally adjacent to the free end 70 of the free end portion 66 of the first bracket 58. The stop 106 includes a contact surface 108. The contact surface 108 of the stop 106 is adapted to abut a portion of the second bracket 60 when the second bracket 60 is in the open position.

In the depicted embodiment, the first bracket 58 includes a first stop 106a and a second stop 106b. The first and second stops 106a, 106b extend outwardly from the free end portion 66 of the first bracket 58. The first and second stops 106a, 106b are disposed at an angle relative to the free end portion 66 of the first bracket 58. In the depicted embodiment, the first and second stops 106a, 106b are generally perpendicular to the free end portion 66 of the first bracket 58. In another embodiment, first and second stops 106a, 106b are generally disposed at an angle relative to the free end portion 66 of the first bracket 58 that is greater than or equal to about 40 degrees.

In one embodiment, the contact surface 108 of the stop 106 abuts the side portion 74 of the second bracket 60. In another embodiment, the stop 106 abuts a tab 110 of the second bracket.

In the depicted embodiment, the second bracket 60 includes the tab 110, which is adapted to engage the contact surface 108 of the stop 106 of the first bracket 58. In the depicted embodiment, the second bracket 60 includes a first tab 110a and a second tab 110b. The first and second tabs 110a, 110b are generally aligned with the first and second stops 106a, 106b.

The first and second tabs 110a, 110b extend outwardly from the side portion 74 of the second bracket 60. In the depicted embodiment, the first and second tabs 110a, 110b extend outwardly from the side portion 74 in a generally perpendicular direction.

Referring now to FIGS. 1-3, a method of using the tray assembly 50 will be described. A fiber optic cable is routed to the tray assembly 50 from the cable openings 32 in the first end 28 of the base 12 of the fiber optic enclosure 10. The fiber optic cable is routed into the tray assembly 50 between the second bracket 60 and the divider panel 62. In one embodiment, the fiber optic cable is routed into the tray assembly 50 along a path that is generally parallel to the pivot axis 72 of the tray assembly 50.

Optical fibers of the fiber optic cable are routed to the first and second sets of trays 54, 56. In the depicted embodiment, the optical fibers are routed to the first tray 82a of the first set of trays 54 and then to the second and third trays 82b, 82c of the first set of trays 54. In one embodiment, the optical fibers are spliced to pigtails in the tray assembly 50. The pigtails are routed from the tray assembly 50 to the telecommunications components on the swing frame 42.

To access the individual trays 82 of the first set of trays 54, the second bracket 60 is pivoted about the pivot axis 72 of the mounting bracket 52 to the open position. With the second bracket 60 in the open position, the third tray 82c is accessible. To access the second tray 82b, the third tray 82c is pivoted about the pivot axis 92 of the second tray 82b to the closed position (i.e., where the third tray 82c is generally parallel to the base plate 38). To access the first tray 82a, the second and third trays 82b, 82c are pivoted about the pivot axis 90 of the first tray 82a to the closed position (i.e., where the second and third trays 82b, 82c are generally parallel to the base plate 38).

To access the individual trays 94 of the second set of trays 56, the divider panel 62 is pivoted about the pivot axis 72 of the mounting bracket 52 to the open position. With the divider panel 62 in the open position, the third tray 94c is accessible. To access the second tray 94b, the third tray 94c is pivoted about the pivot axis 104 of the second tray 94b to the closed position (i.e., where the third tray 94c is generally parallel to the base plate 38). To access the first tray 94a, the second and third trays 94b, 94c are pivoted about the pivot axis 102 of the first tray 94a to the closed position (i.e., where the second and third trays 94b, 94c are generally parallel to the base plate 38).

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A tray assembly for a fiber optic enclosure, the tray assembly comprising:
   a mounting bracket including:
   a first bracket configured for mounting to a fiber optic enclosure, the first bracket defining a pivot axis;
   a second bracket engaged to the first bracket and adapted to pivot about the pivot axis between a closed position and an open position;
   a divider panel engaged to the first bracket and adapted to pivot about the pivot axis between a closed position and an open position;
   a first set of trays engaged to the second bracket; and
   a second set of trays engaged to the divider panel, wherein the divider panel is disposed between the first and second sets of trays.

2. The tray assembly of claim 1, wherein the first bracket includes a base portion and a free end portion, the base portion being configured for mounting to the fiber optic enclosure, the free end portion defining the pivot axis, the second bracket and the divider panel being engaged to the free end portion of the first bracket.

3. The tray assembly of claim 1, wherein the first bracket includes a stop that is adapted to abut the second bracket to prevent movement of the second bracket beyond the open position.

4. The tray assembly of claim 3, wherein the second bracket includes a tab that is adapted to abut the stop in the open position.

5. The tray assembly of claim 3, wherein the first bracket includes a first stop and a second stop.

6. The tray assembly of claim 5, wherein the second bracket includes a first tab and a second tab, the first and second tabs being generally aligned with the first and second stops and being adapted to abut the first and second stops when the second bracket is in the open position.

7. The tray assembly of claim 1, wherein the first set of trays extends farther outwardly than the second set of trays when the second bracket and the divider panel are in the open position.

8. A tray assembly for a fiber optic enclosure, the tray assembly comprising:
   a mounting bracket including:
   a first bracket including a base portion and a free end portion, the base portion being configured for mounting to a fiber optic enclosure, the free end portion defining a pivot axis;
   a second bracket engaged to the free end portion of the first bracket and adapted to pivot about the pivot axis between a closed position and an open position;
   a divider panel engaged to the free end portion of the first bracket and adapted to pivot about the pivot axis between a closed position and an open position;
   a first set of trays engaged to the second bracket, wherein each of the trays of the first set of trays is adapted to pivot about a pivot axis defined by an adjacent tray; and
   a second set of trays engaged to the divider panel, the divider panel being disposed between the first and second sets of trays, wherein each of the trays of the second set of trays is adapted to pivot about a pivot axis defined by an adjacent tray.

9. The tray assembly of claim 8, wherein the first bracket includes a stop that is adapted to abut the second bracket to prevent movement of the second bracket beyond the open position.

10. The tray assembly of claim 9, wherein the second bracket includes a tab that is adapted to abut the stop in the open position.

11. The tray assembly of claim 9, wherein the first bracket includes a first stop and a second stop.

12. The tray assembly of claim 11, wherein the second bracket includes a first tab and a second tab, the first and second tabs being generally aligned with the first and second stops and being adapted to abut the first and second stops when the second bracket is in the open position.

13. The tray assembly of claim 8, wherein the first set of trays extends farther outwardly than the second set of trays when the second bracket and the divider panel are in the open position.

14. A fiber optic enclosure comprising:
   a base including a base wall, a first sidewall that extends outwardly from the base wall and a second sidewall that extends outwardly from the base wall;
   a cover engaged to the base, the base and the cover defining an interior region;
   a tray assembly disposed in the interior region, the tray assembly including:
   a mounting bracket including:
   a first bracket configured for mounting to the base wall, the first bracket defining a pivot axis;
   a second bracket engaged to the first bracket and adapted to pivot about the pivot axis between a closed position and an open position;
   a divider panel engaged to the first bracket and adapted to pivot about the pivot axis between a closed position and an open position;
   a first set of trays engaged to the second bracket; and
   a second set of trays engaged to the divider panel, wherein the divider panel is disposed between the first and second sets of trays.

15. The fiber optic enclosure of claim 14, wherein the first set of trays extends farther outwardly from the base wall than the second set of trays when the second bracket and the divider panel are in the open position.

16. The fiber optic enclosure of claim 14, wherein the first bracket includes a base portion and a free end portion, the base portion being configured for mounting to the fiber optic enclosure, the free end portion defining the pivot axis, the second bracket and the divider panel being engaged to the free end portion of the first bracket.

17. The fiber optic enclosure of claim 14, wherein the first bracket includes a stop that is adapted to abut the second bracket to prevent movement of the second bracket beyond the open position.

18. The fiber optic enclosure of claim 17, wherein the second bracket includes a tab that is adapted to abut the stop in the open position.

19. The fiber optic enclosure of claim 17, wherein the first bracket includes a first stop and a second stop.

20. The fiber optic enclosure of claim 19, wherein the second bracket includes a first tab and a second tab, the first and second tabs being generally aligned with the first and second stops and being adapted to abut the first and second stops when the second bracket is in the open position.

* * * * *